(12) United States Patent
Chen et al.

(10) Patent No.: US 11,699,222 B2
(45) Date of Patent: Jul. 11, 2023

(54) IMAGE PROCESSING DEVICE AND A METHOD FOR IMAGE ENHANCEMENT

(71) Applicant: Novatek Microelectronics Corp., Hsinchu (TW)

(72) Inventors: Chieh-Cheng Chen, Changhua County (TW); Po-Wei Chen, Kaohsiung (TW)

(73) Assignee: Novatek Microelectronics Corp., Hsinchu (TW)

( * ) Notice: Subject to any disclaimer, the term of this patent is extended or adjusted under 35 U.S.C. 154(b) by 101 days.

(21) Appl. No.: 17/180,663

(22) Filed: Feb. 19, 2021

(65) Prior Publication Data
US 2022/0270223 A1  Aug. 25, 2022

(51) Int. Cl.
*G06T 5/00* (2006.01)
*G06T 5/50* (2006.01)
*G06T 3/40* (2006.01)
*G06T 7/13* (2017.01)

(52) U.S. Cl.
CPC ............ *G06T 5/50* (2013.01); *G06T 3/40* (2013.01); *G06T 5/001* (2013.01); *G06T 7/13* (2017.01); *G06T 2207/10024* (2013.01); *G06T 2207/20084* (2013.01); *G06T 2207/20221* (2013.01)

(58) Field of Classification Search
CPC . G06T 5/002; G06T 5/50; G06T 2207/20016; G06T 2207/20084; G06T 2207/20221; G06T 1/00; G06V 10/42
See application file for complete search history.

(56) References Cited

U.S. PATENT DOCUMENTS

| | | | |
|---|---|---|---|
| 9,600,741 B1 * | 3/2017 | Su | G06T 5/50 |
| 10,405,820 B2 * | 9/2019 | Wang | A61B 6/4405 |
| 11,151,702 B1 * | 10/2021 | Tico | G06T 5/50 |
| 2011/0206293 A1 * | 8/2011 | Sasaki | G06T 5/50 |
| | | | 382/274 |
| 2018/0349759 A1 * | 12/2018 | Isogawa | G06N 3/0481 |

* cited by examiner

*Primary Examiner* — Li Liu
(74) *Attorney, Agent, or Firm* — JCIPRNET (57) ABSTRACT

The disclosure provides an image processing device. An image processing device includes a neural network circuit, a gain control circuit, and an image merge circuit. The neural network circuit is configured to receive an input image, and perform an image processing operation on the input image according to fixed parameters to output a first intermediate image. The gain control circuit, coupled to the neural network circuit, is configured to receive the first intermediate image from the neural network circuit, and multiply the first intermediate image by at least one amplitude gain to output a second intermediate image. The image merge circuit, coupled to the gain control circuit, configured to receive the second intermediate image and the input image, and combine the second intermediate image and the input image to obtain an output image. In addition, a method for image enhancement is also provided.

10 Claims, 11 Drawing Sheets

IMAGE PROCESSING DEVICE AND A METHOD FOR IMAGE ENHANCEMENT

BACKGROUND

Technical Field

The disclosure relates to an image processing device and a method for image enhancement.

Description of Related Art

In deep learning, a convolutional neural network (CNN) is a class of deep neural networks, most commonly used in image analysis. Conventionally, for the CNN to change an enhancement effect, the CNN must retain another set of parameters, so a training dataset corresponding to a new enhancement effect must be prepared, which is time-consuming and labor-intensive. In addition, the number of parameters of the CNN requires is usually so large that it takes a long time to update the parameters when switching the enhancement effect. Thus, it becomes problematic to switch modes quickly. In addition, if there are different parameters for different effects, storage space for the additional parameters will be very large. Such technique costs a significant amount of storage space.

SUMMARY

An image processing device and a method for image enhancement are proposed.

An embodiment of the invention, the image processing device includes a neural network circuit, a gain control circuit and an image merge circuit. The neural network circuit is configured to receive an input image and perform an image processing operation on the input image according to fixed parameters to output a first intermediate image. The gain control circuit is coupled to the neural network circuit. The gain control circuit is configured to receive the first intermediate image from the neural network circuit, and multiply the first intermediate image by at least one amplitude gain to output a second intermediate image. The image merge circuit is coupled to the gain control circuit. The image merge circuit is configured to receive the second intermediate image and the input image, and combine the second intermediate image and the input image to obtain an output image.

In an embodiment of the invention, the image processing device further includes a scaler circuit. The scaler circuit is configured to receive and scale the input image, and output the scaled input image. The image merge circuit combines the second intermediate image and the scaled input image to obtain the output image.

In an embodiment of the invention, the gain control circuit multiplies the first intermediate image by different amplitude gains according to image details. The image details include edges, texture and/or lines of the first intermediate image.

In an embodiment of the invention, the image details correspond to different frequency bands. The gain control circuit includes a transformer circuit. The transformer circuit is coupled to the neural network circuit. The transformer circuit is configured to receive and analyze the first intermediate image to obtain the frequency bands corresponding to the image details.

In an embodiment of the invention, the gain control circuit multiplies the first intermediate image by the different amplitude gains according to the frequency bands.

In an embodiment of the invention, the gain control circuit includes a detection circuit. The detection circuit is configured to receive the input image and detect edges of the input image to obtain edge strength. The gain control circuit multiplies the first intermediate image by different amplitude gains according to the edge strength.

In an embodiment of the invention, the edges of the input image include a first edge and a second edge. The first edge has a first edge strength, and the second edge has a second edge strength which is smaller than the first edge strength. The first edge is multiplied by a first amplitude gain, and the second edge is multiplied by a second amplitude gain. The first amplitude gain is smaller than the second amplitude gain.

In an embodiment of the invention, the gain control circuit includes a selection circuit. The selection circuit is configured to receive the input image and select color ranges of the input image. The gain control circuit multiplies the first intermediate image by different amplitude gains according to the color ranges.

In an embodiment of the invention, the color ranges of the input image include a skin tone range and a non-skin tone range. The skin tone range is multiplied by a first amplitude gain, and the non-skin tone range is multiplied by a second amplitude gain. The first amplitude gain is smaller than the second amplitude gain.

An embodiment of the invention provides a method for image enhancement including: performing an image processing operation on an input image according to fixed parameters to output a first intermediate image; multiplying the first intermediate image by at least one amplitude gain to output a second intermediate image; and combining the second intermediate image and the input image to obtain an output image.

In an embodiment of the invention, the method for image enhancement further includes: scaling the input image and outputting the scaled input image; and combining the second intermediate image and the scaled input image to obtain the output image.

In an embodiment of the invention, the first intermediate image is multiplied by different amplitude gains according to image details. The image details include edges, texture and/or lines of the first intermediate image.

In an embodiment of the invention, the image details correspond to different frequency bands. The method further includes: analyzing the first intermediate image to obtain the frequency bands corresponding to the image details.

In an embodiment of the invention, the first intermediate image is multiplied by the different amplitude gains according to the frequency bands.

In an embodiment of the invention, the method further includes: detecting edges of the input image to obtain edge strength. The step of multiplying the first intermediate image by the at least one amplitude gain to output the second intermediate image includes: multiplying the first intermediate image by different amplitude gains according to the edge strength.

In an embodiment of the invention, the edges of the input image comprise a first edge and a second edge. The first edge has a first edge strength, and the second edge has a second edge strength which is smaller than the first edge strength. The first edge is multiplied by a first amplitude gain, and the second edge is multiplied by a second amplitude gain. The first amplitude gain is smaller than the second amplitude gain.

In an embodiment of the invention, the method further includes: selecting color ranges of the input image. The step of multiplying the first intermediate image by the at least one amplitude gain to output the second intermediate image includes: multiplying the first intermediate image by different amplitude gains according to the color ranges.

In an embodiment of the invention, the color ranges of the input image include a skin tone range and a non-skin tone range. The skin tone range is multiplied by a first amplitude gain, and the non-skin tone range is multiplied by a second amplitude gain. The first amplitude gain is smaller than the second amplitude gain.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements.

Like reference numerals refer to like elements throughout.

Figure 1:
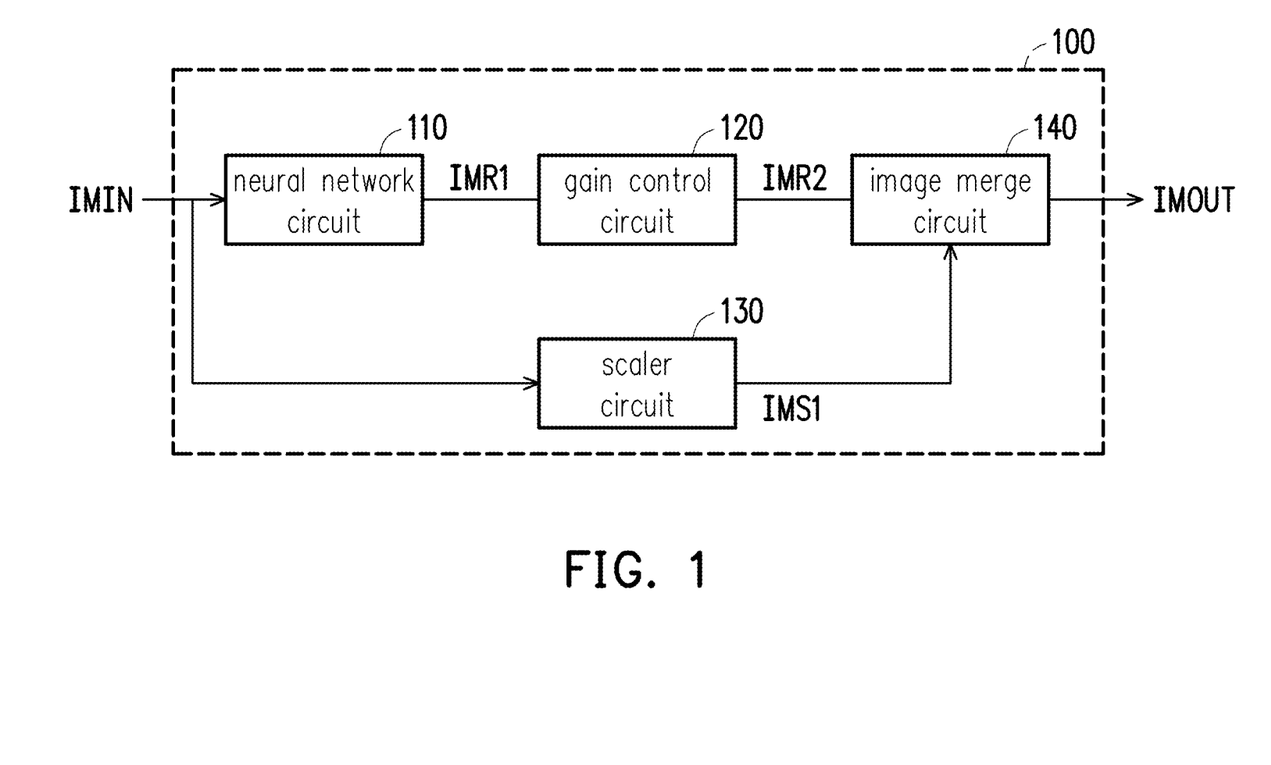
FIG. 1 illustrates a schematic diagram of an image processing device in accordance with an embodiment of the disclosure.

FIG. 1 illustrates a schematic diagram of an image processing device in accordance with an embodiment of the disclosure. Referring to FIG. 1, the image processing device 100 performs a method for image enhancement on an input image IMIN and outputs an output image IMOUT.

To be specific, the image processing device 100 includes a neural network circuit 110, a gain control circuit 120, a scaler circuit 130 and an image merge circuit 140. The neural network circuit 110 is configured to receive the input image IMIN and perform an image processing operation on the input image IMIN according to fixed parameters to output a first intermediate image IMR1. In the present embodiment, the image processing operation of the neural network circuit 110 may include enhancement of an image resolution, an image brightness, an image spectral distribution, an image discrepancy, an image relevancy, an image color depth, an image sharpness or an image refresh rate.

The gain control circuit 120 is coupled to the neural network circuit 110. The gain control circuit 120 is configured to receive the first intermediate image IMR1 from the neural network circuit 110, and multiply the first intermediate image IMR1 by at least one amplitude gain to output a second intermediate image IMR2. In an embodiment, the first intermediate image IMR1 may be multiplied by different amplitude gains according image details of the first intermediate image IMR1. In an embodiment, an adjustment of amplitude gains may be done through table lookup, linear scaling, experience rule, non-linear rule, theoretical calculation, or customized special mode. However, the invention is not limited thereto.

The scaler circuit 130 is configured to receive and scale the input image IMIN. The scaler circuit 130 outputs the scaled input image IMS1 to the image merge circuit 140. The image merge circuit 140 is coupled to the gain control circuit 120 and the scaler circuit 130. The image merge circuit 140 combines the second intermediate image IMR2 and the scaled input image IMS1 to obtain the output image IMOUT. In other words, in the present embodiment, the input image IMIN are transmitted to two different paths to be processed accordingly. For example, the input image IMIN is transmitted to the neural network circuit 110 for enhancement processing, and the gain control circuit 120 for successive enhancement processing. The input image IMIN is also transmitted to the scaler circuit 130 for scaling processing.

In an embodiment, an image scaling operation may be unnecessary for the input image IMIN, and thus the scaler circuit 130 can be omitted from the image processing device 100. In this case, the image merge circuit 140 directly receives the second intermediate image IMR2 and the input image IMS1, and combines the second intermediate image IMR2 and the input image IMIN, which is not scaled, to obtain the output image IMOUT.

In the present embodiment, the circuit blocks of the image processing device 100 may be a hardware circuit designed through Hardware Description Language (HDL) or any other design methods for digital circuit well-known to persons with ordinary skill in the art and may be implemented in from of Field Programmable Gate Array (FPGA), Complex Programmable Logic Device (CPLD) or Application-specific Integrated Circuit (ASIC).

In the present embodiment, the neural network circuit 110 includes a convolutional neural network (CNN). A CNN refers to a trained multilayer neural network structure including trained parameters at each layer of a plurality of layers of the CNN. Each trained parameter has certain weight and bias. Therefore, a trained feature may be reflected from a plurality of trained parameters using a plurality of training images in a training dataset at each layer of the plurality of layers of the CNN. When the neural network circuit 110 receives the input image IMIN, the neural network circuit 110 may perform an image processing operation on the input image IMIN according to the trained parameters to output the first intermediate image IMR1 to the gain control circuit 120. The image processing operation is an enhancement processing on the input image IMIN.

In an embodiment, the neural network circuit 110 may include a processor or a computer implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result.

Figure 2:
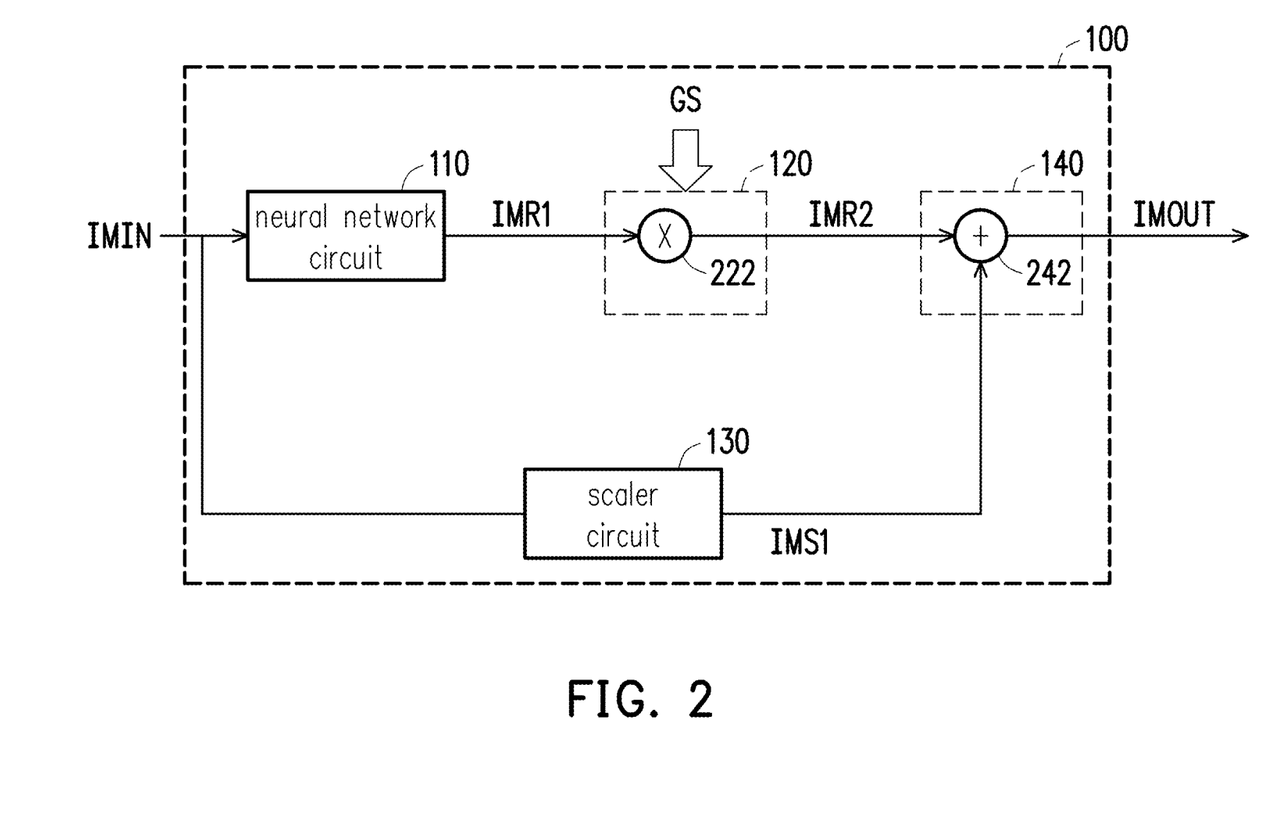
FIG. 2 illustrates a schematic diagram of an image processing device in accordance with another embodiment of the disclosure.
Figure 3:
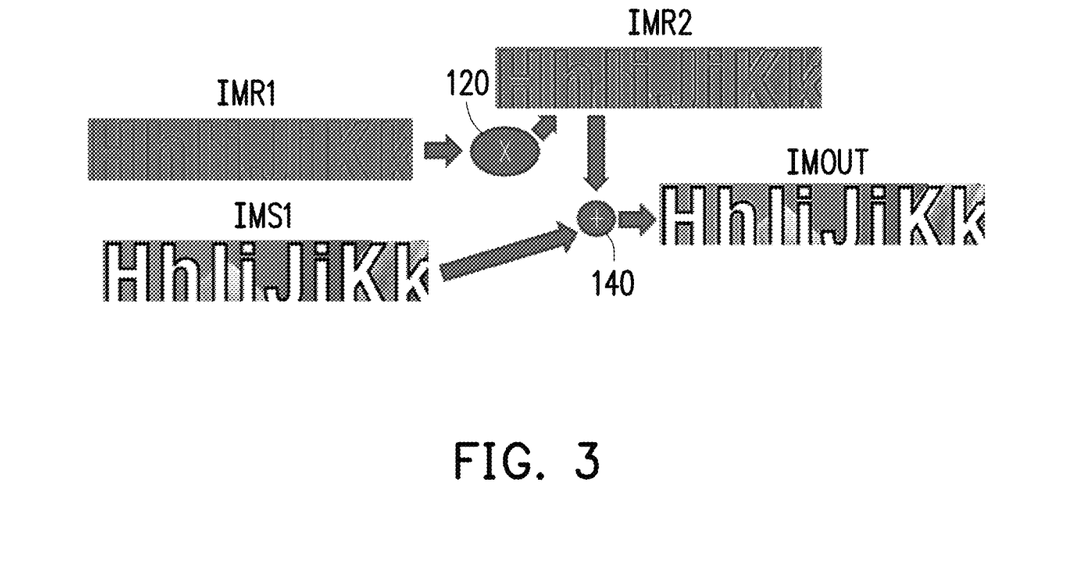
FIG. 3 illustrates a schematic diagram of intermediate images, a scaled image and an output image in accordance with an embodiment of the disclosure.

FIG. 2 illustrates a schematic diagram of an image processing device in accordance with another embodiment of the disclosure. FIG. 3 illustrates a schematic diagram of intermediate images, a scaled image and an output image in accordance with an embodiment of the disclosure. Referring to FIG. 2 and FIG. 3, the gain control circuit 120 performs the successive enhancement processing on the first intermediate image IMR1 according to at least one amplitude gain GS and outputs the second intermediate image IMR2.

The gain control circuit 120 may include a multiplier 222. The multiplier 222 multiplies the first intermediate image IMR1 by the amplitude gain GS to output the second intermediate image IMR2. The at least one amplitude gain GS is used to control an enhancement strength of the successive enhancement processing on the first intermediate image IMR1. The amplitude gain GS may be set according to a user instruction, and/or set by a detection circuit or a selection circuit to be discussed in detail later, or the like. The disclosure is not limited to a particular way to obtain the amplitude gain GS.

In the present embodiment, the successive enhancement processing of the gain control circuit 120 further can assist enhancing the first intermediate image IMR1 from the neural network circuit 110 to deliver a more enhancement. In this way, the plurality of trained parameters may remain fixed as fixed parameters in the neural network circuit 110. Therefore, storage space required for neural network parameters and the time required for switching the enhancement effects may be reduced, thereby reducing hardware area and power consumption of the image processing device 100. In an embodiment, the gain control circuit 120 may be an automatic gain control (AGC) circuit to perform gain adjustment for the first intermediate image IMR1.

The image merge circuit 140 includes an adder circuit 242. The adder circuit 242 is configured to combine the second intermediate image IMR2 and the scaled input image IMS1 to obtain the output image IMOUT by adding the second intermediate image IMR2 and the scaled input image IMS1 together. The output image IMOUT is an image enhanced by the enhancement processing of the neural network 110 and the successive enhancement processing of the gain control circuit 120. As can be seen from FIG. 3, by multiplying the amplitude gain GS, enhancement/sharpening on the edges may be observed between the first intermediate image IMR1 and second intermediate image IMR2.

Figure 4:
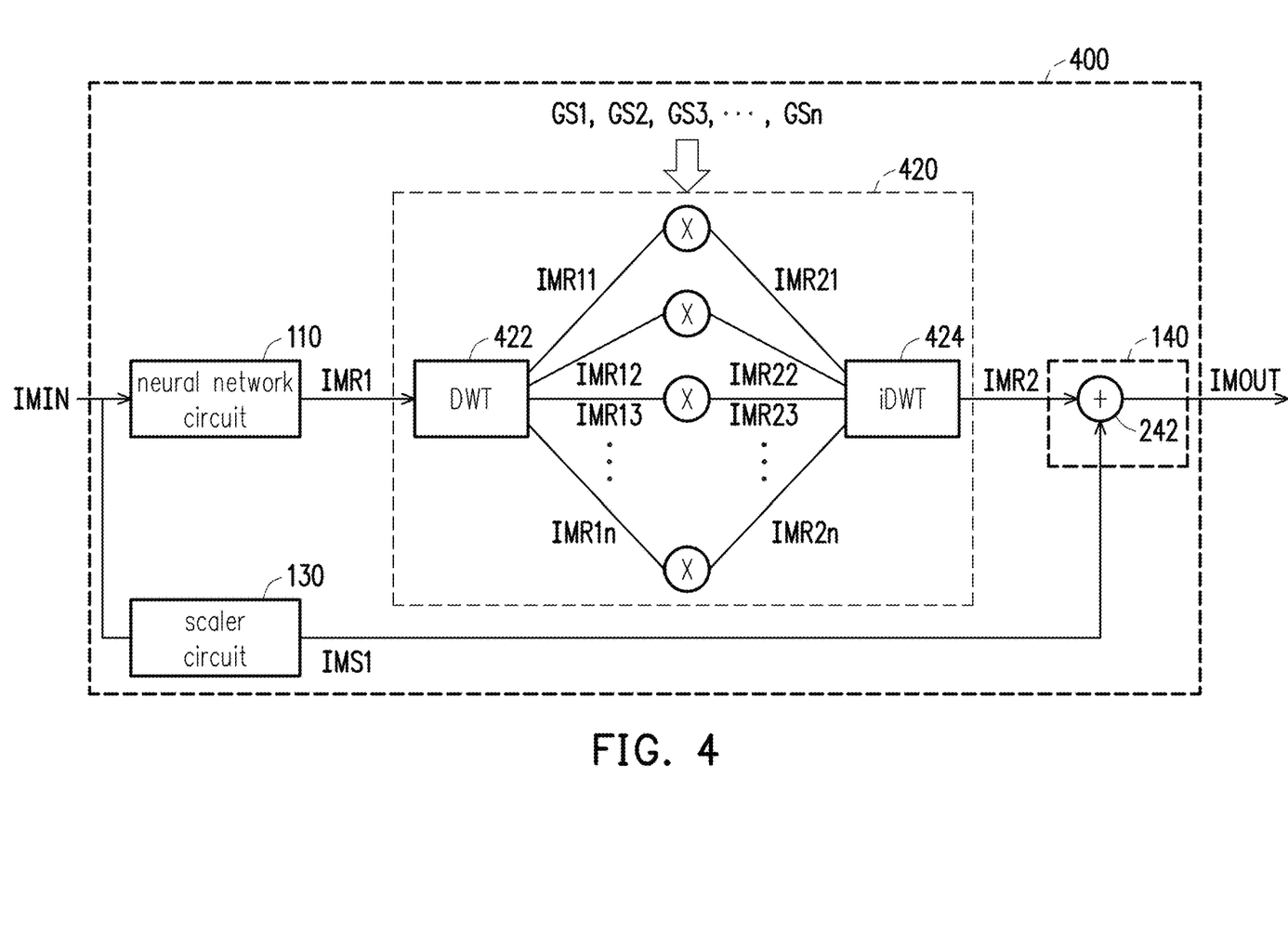
FIG. 4 illustrates a schematic diagram of an image processing device in accordance with another embodiment of the disclosure.

FIG. 4 illustrates a schematic diagram of an image processing device in accordance with another embodiment of the disclosure. Referring to FIG. 4, neural network circuit 110, scaler circuit 130 and image merge circuit 140 are similar to the neural network circuit 110, the scaler circuit 130 and the image merge circuit 140 of FIG. 1 and FIG. 2, and therefore will not be repeated. Instead of being coupled to the gain control circuit 120, the output of the neural network circuit 110 is coupled to gain control circuit 420.

In the present embodiment, the gain control circuit 420 multiplies the first intermediate image IMR1 by different amplitude gains GS1, GS2, GS3 to GSn according to image details. The image details include edges, texture and/or lines of the first intermediate image IMR1, and the image details correspond to different frequency bands. Therefore, the gain control circuit 420 multiplies the first intermediate image IMR1 by the different amplitude gains GS1 to GSn according to the frequency bands.

To be specific, the gain control circuit 420 includes a transformer circuit coupled to the neural network circuit 110. The transformer circuit includes discrete wavelet transform (DWT) circuit 422 and an inverse wavelet transform (iDWT) circuit 424 to respectively perform discrete wavelet transform and inverse discrete wavelet transform on the first intermediate image IMR1 to obtain the second intermediate image IMR2. In detail, the DWT circuit 422 receives and analyses the first intermediate image IMR1 by performing DWT on the first intermediate image IMR1 to divide the first intermediate image IMR1 into a plurality of first sub-image components IMR11-IMR1$n$ having different frequency bands. The first sub-image components IMR11-IMR1$n$ having higher frequencies are image components of more detailed areas, and the first sub-image components IMR11-IMR1$n$ having lower frequencies are image components of less detailed areas. The gain control circuit 420 performs enhancement processing by multiplying different amplitude gains GS1 to GSn to the plurality of first sub-image components IMR11-IMR1$n$ having different image details corresponding to different frequency bands, in order to obtain a plurality of second sub-image components IMR21-IMR2$n$, respectively. The iDWT circuit 424 then performs iDWT on the plurality of second sub-image components IMR21-IMR2$n$ to combine the plurality of the second sub-image components IMR21-IMR2$n$ and obtain the second intermediate image IMR2. In this way, the gain control circuit 420 performs enhancement processing using different amplitude gains GS1 to GSn to different first sub-image components IMR11-IMR1$n$, and obtains second intermediate image IMR2 having different enhancement strengths in different image details such as edges, textures, or lines. At this point, the image merge circuit 140 combines the second intermediate image IMR2 and the scaled input image IMS1 to obtain an output image IMOUT.

Figure 5:
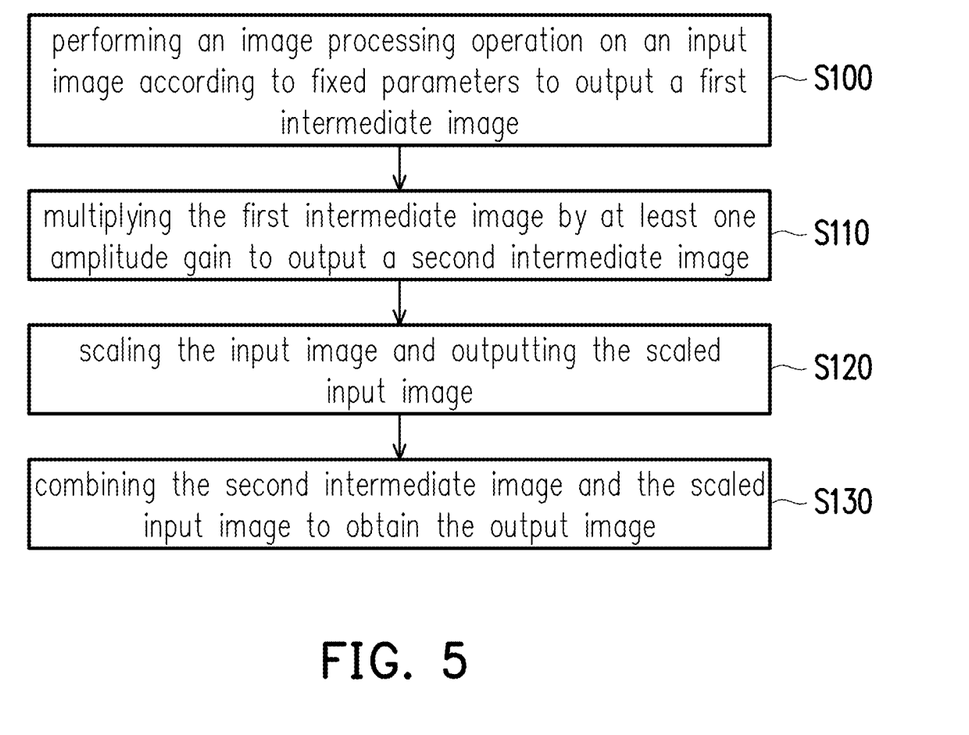
FIG. 5 is a flowchart illustrating steps in a method for image enhancement according to an embodiment of the invention.

FIG. 5 is a flowchart illustrating steps in a method for image enhancement according to an embodiment of the invention. Referring to FIG. 1 and FIG. 5, in the present embodiment, the method for image enhancement is at least adapted to the image processing device 100 depicted in FIG. 1, but the disclosure is not limited thereto. Taking the image processing device 100 for example, in step S100, the image processing device 100 performs an image processing operation on an input image IMIN according to fixed parameters to output a first intermediate image IMR1. In step S110, the image processing device 100 multiplies the first intermediate image IMR1 by at least one amplitude gain to output a second intermediate image IMR2. In step S120, the image processing device 100 scales the input image IMIN and outputs the scaled input image IMS1. In step S120, the image processing device 100 combines the second intermediate image IMR2 and the scaled input image IMS1 to obtain the output image IMOUT.

The method for image enhancement described in the embodiment of the invention is sufficiently taught, suggested, and embodied in the embodiments illustrated in FIG. 1 to FIG. 4, and therefore no further description is provided herein.

As mentioned earlier, the neural network circuit 110 includes trained parameters at each layer. To change the enhancement effect, a training dataset corresponding to a new enhancement effect must be prepared and the time to update the parameters when switching the enhancement effect is long. The storage space required is large if there are different parameters for different effects. Therefore, by realizing enhancement switching through the enhancement function on the first intermediate image to obtain the second intermediate image and retaining the trained parameters fixed, the disclosure reduces the time required to retrain the parameters or the storage space for a new set of trained parameters. The disclosure, thereby, reduces the time between switching of the enhancement effects.

It is to be noted here that the scaler circuit 130 may be optionally included, and that scaling of the input image IMIN using the scaler circuit 130 may be optionally performed. Therefore, if there is no scaler circuit 130 or no scaling of the input image IMIN is performed, the input image IMIN is combined with an intermediate image outputted from the gain control circuit, as may be exemplified by FIG. 6 to FIG. 10 below.

Figure 6:
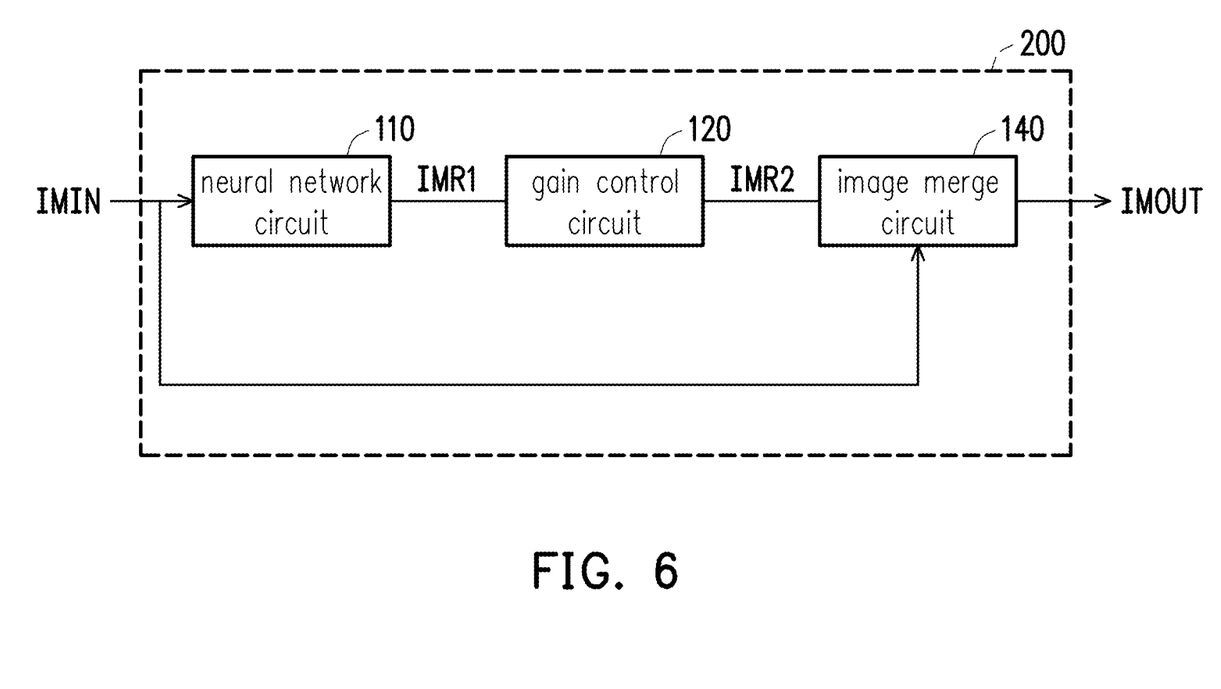
FIG. 6 illustrates a schematic diagram of an image processing device in accordance with an embodiment of the disclosure.

FIG. 6 illustrates a schematic diagram of an image processing device in accordance with an embodiment of the disclosure. Referring to FIG. 1 and FIG. 6, the image processing device 200 of FIG. 6 differs from the image processing device 100 of FIG. 1 in that no scaling of the input image IMIN is performed.

To be specific, the image processing device 200 includes the neural network circuit 110, the gain control circuit 120 and the image merge circuit 140. The neural network circuit 110 is configured to receive the input image IMIN and perform an image processing operation on the input image IMIN according to fixed parameters to output the first intermediate image IMR1. The gain control circuit 120 is coupled to the neural network circuit 110. The gain control circuit 120 is configured to receive the first intermediate image IMR1 from the neural network circuit 110, and multiply the first intermediate image IMR1 by at least one amplitude gain to output a second intermediate image IMR2. The image merge circuit 140 is coupled to the gain control circuit 120. The image merge circuit 140 is configured to directly receive the second intermediate image and the input image IMIN, and combine the second intermediate image IMR2 and the input image IMIN to obtain the output image IMOUT.

Figure 7:
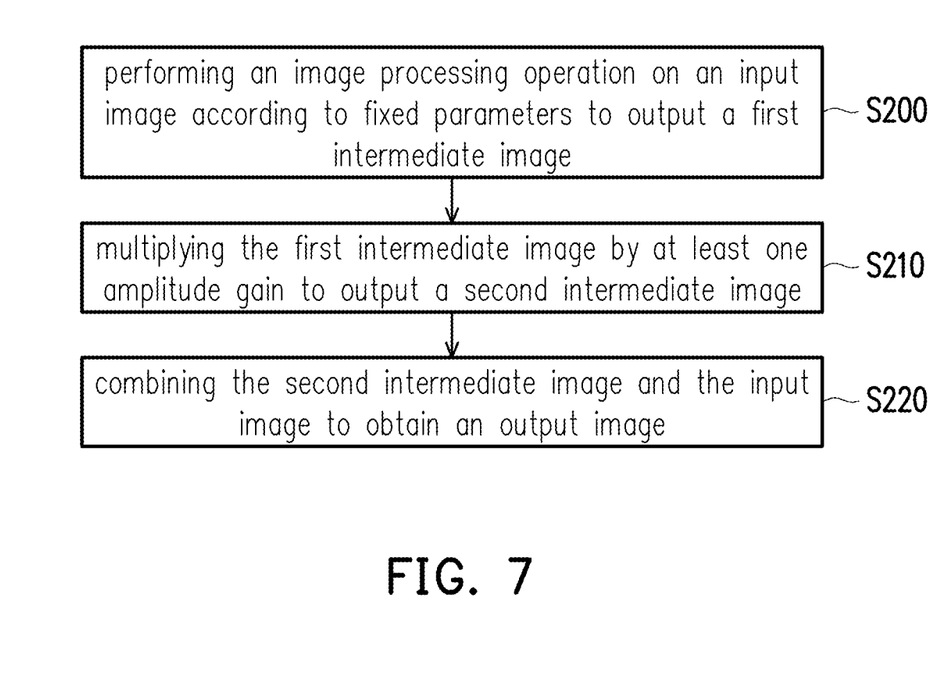
FIG. 7 is a flowchart illustrating steps in a method for image enhancement according to another embodiment of the invention.

FIG. 7 is a flowchart illustrating steps in a method for image enhancement according to another embodiment of the invention. Referring to FIG. 6 and FIG. 7, in the present embodiment, the method for image enhancement is at least adapted to the image processing device 200 depicted in FIG. 6, but the disclosure is not limited thereto. Taking the image processing device 200 for example, in step S200, the image processing device 200 performs an image processing operation on an input image IMIN according to fixed parameters to output a first intermediate image IMR1. In step S210, the image processing device 200 multiplies the first intermediate image IMR1 by at least one amplitude gain to output a second intermediate image IMR2. In step S220, the image processing device 200 combines the second intermediate image IMR2 and the scaled input image IMS1 to obtain the output image IMOUT.

The method for image enhancement described in the embodiment of the invention is sufficiently taught, suggested, and embodied in the embodiments illustrated in FIG. 1 to FIG. 6, and therefore no further description is provided herein.

Figure 8:
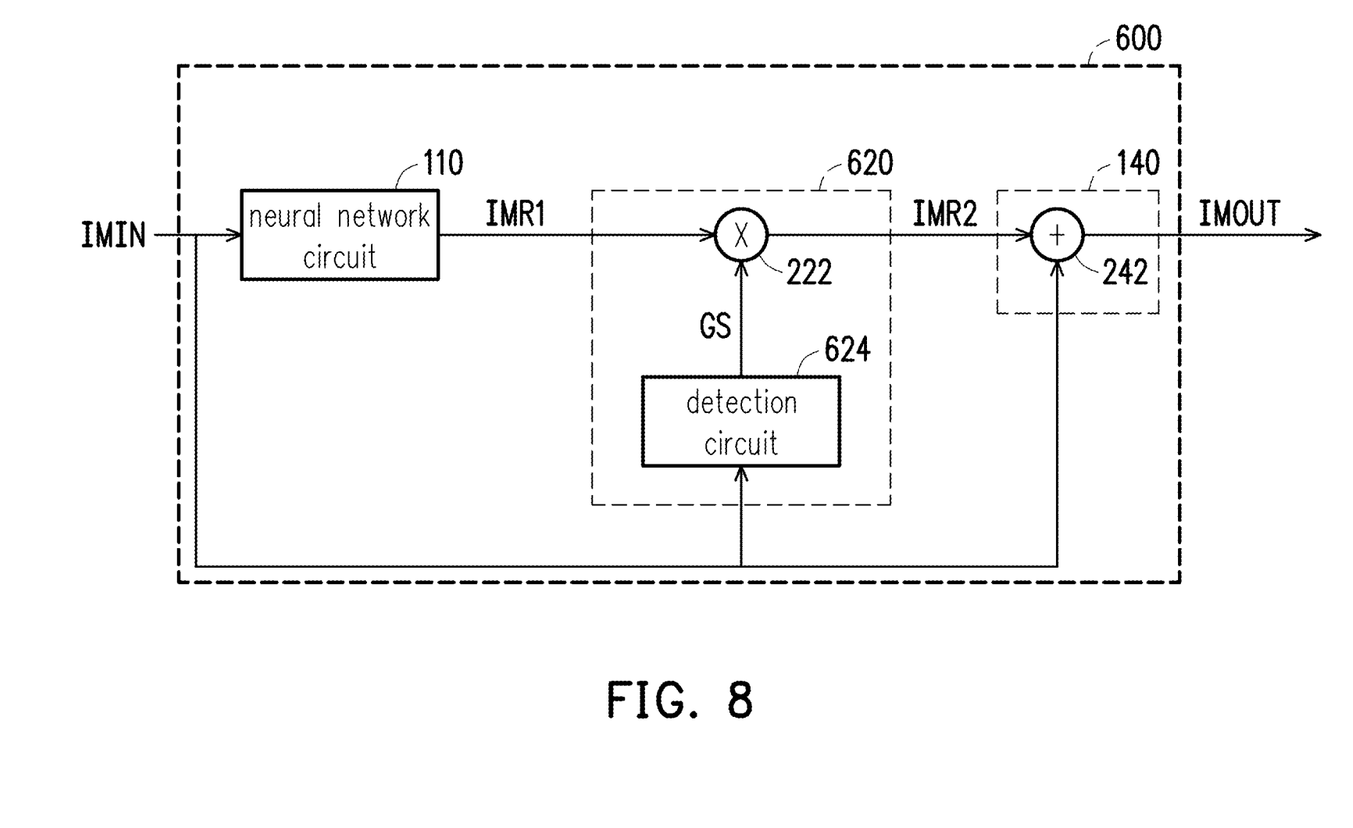
FIG. 8 illustrates a schematic diagram of an image processing device in accordance with another embodiment of the disclosure.
Figure 9:
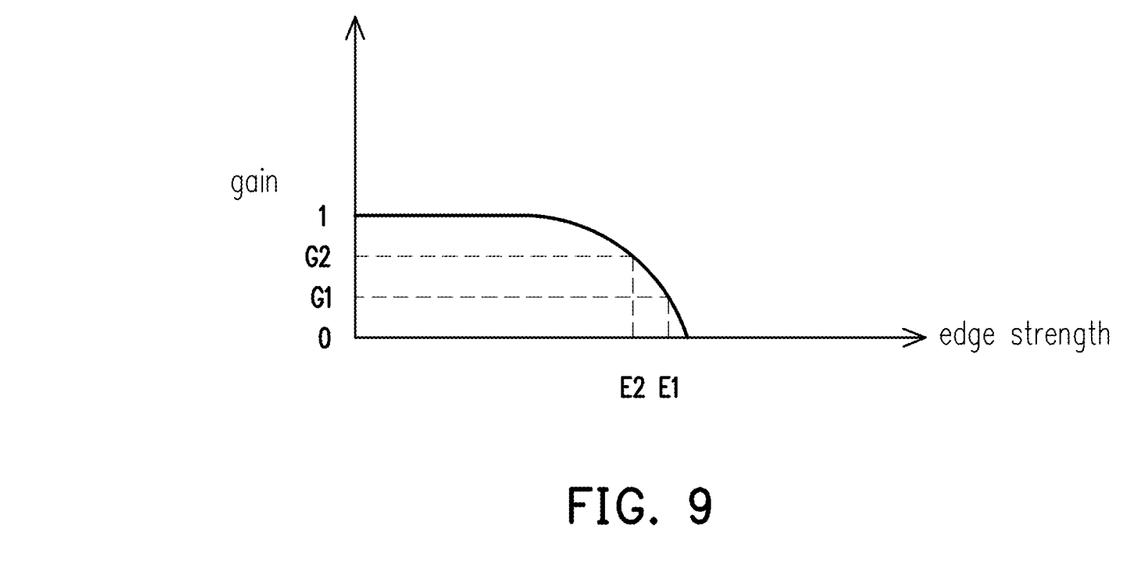
FIG. 9 illustrates a curve of an amplitude gain function in accordance with an embodiment of the disclosure.

FIG. 8 illustrates a schematic diagram of an image processing device in accordance with another embodiment of the disclosure. FIG. 9 illustrates a curve of an amplitude gain function in accordance with an embodiment of the disclosure. The neural network circuit 110 of FIG. 8 is similar to the neural network circuit 110 of FIG. 1, and therefore will not be repeated. Instead of being coupled to the gain control circuit 120, the output of the neural network circuit 110 is coupled to gain control circuit 620.

In the present embodiment, the image processing device 600 may obtain an amplitude gain GS from a detection circuit 624. In FIG. 8, the gain control circuit 620 includes the multiplier circuit 222 and the detection circuit 624. The detection circuit 624 receives the input image IMIN and performs an edge detection process on the input image IMIN, and generates the amplitude gain GS. The multiplier circuit 222, coupled to the neural network circuit 110 and the detection circuit 624, receives the first intermediate image IMR1 from the neural network circuit 100 and receives the amplitude gain GS from the detection circuit 624, respectively, and multiplies the first intermediate image IMR1 by the amplitude gain GS to output the second intermediate image IMR2. The successive enhancement processing on edges by multiplying at least one amplitude gain based on edge strengths of edges in the input image IMIN detected from the edge detection process. The detection circuit 624 may detect which pixels of the input image IMIN correspond to the edges and determine the detected pixels that correspond to the edges as edge pixels. The detection circuit 624 may detect pixel values of the edge pixels as edge strength.

In specific, referring to FIG. 8 and FIG. 9 together, the edges of the input image IMIN include a first edge and a second edge. The first edge has a first edge strength E1, and the second edge has a second edge strength E2 smaller than the first edge strength E1. The first edge is multiplied by a first amplitude gain G1, and the second edge is multiplied by a second amplitude gain G2. In FIG. 9, the first amplitude gain G1 is smaller than the second amplitude gain G2.

When the edge strength of the edge pixels (e.g. the edge strength E1) in the input image IMIN detected from the edge detection process is large, the detection circuit 624 generates the first amplitude gain G1 to the multiplier circuit 222 to multiply a smaller amplitude gain (e.g. the first amplitude gain G1) to corresponding edge pixels of the first intermediate image IMR1. When the edge strength of the edge pixels (e.g. the edge strength E2) in input image IMIN detected from the edge detection process is small, the detection circuit 624 generates the second amplitude gain G2 to the multiplier circuit 222 to multiply a larger amplitude gain (e.g. the second amplitude gain G2) to the corresponding edges pixels of the first intermediate image IMR1. The amplitude gain ranges between 0 and 1, which 0 indicates no edge enhancement and 1 indicates maximum edge enhancement. In this way, the disclosure may prevent the mosquito noise from getting enhanced on the edges when the edge strength of the input image IMIN is large.

The gain control circuit 620 performs the successive enhancement processing on the first intermediate image IMR1 using amplitude gains from the edge detection process to obtain the second intermediate image IMR2. Afterwards, the image merge circuit 140, including an adder circuit 242, is configured to combine the second intermediate image IMR2 and the input image IMIN to obtain the output image IMOUT by adding the second intermediate image IMR2 and the input image IMIN together.

Figure 10:
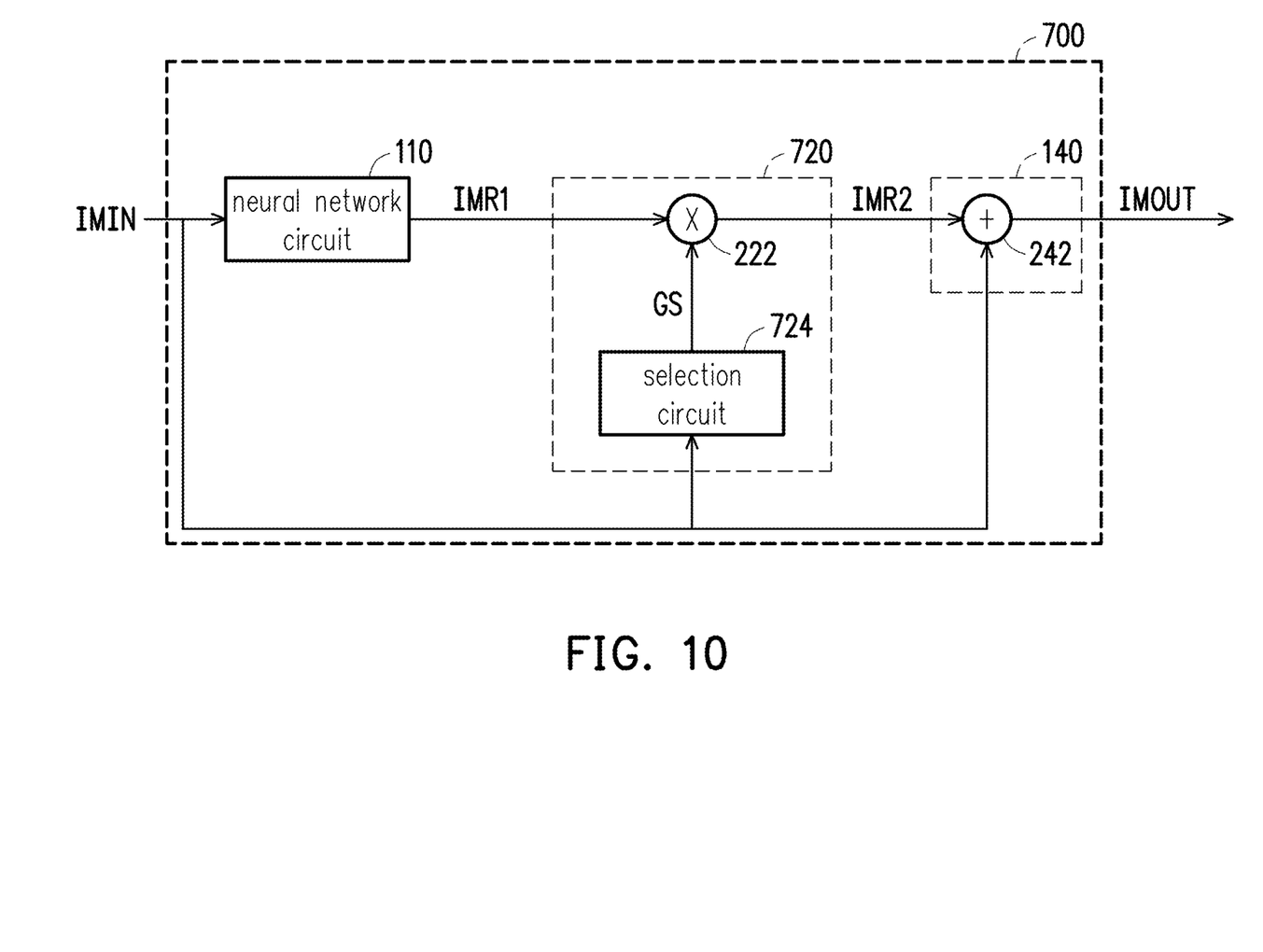
FIG. 10 illustrates a schematic diagram of an image processing device in accordance with another embodiment of the disclosure.
Figure 11:
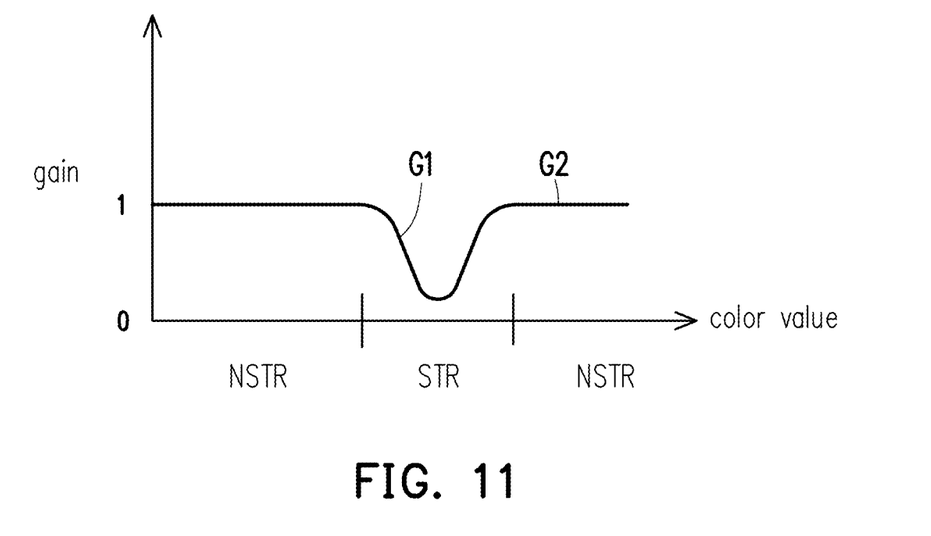
FIG. 11 illustrates a curve of an amplitude gain function in accordance with another embodiment of the disclosure.

FIG. 10 illustrates a schematic diagram of an image processing device in accordance with another embodiment of the disclosure. FIG. 11 illustrates a curve of an amplitude gain function in accordance with another embodiment of the disclosure. The neural network circuit 110 of FIG. 10 is similar to the neural network circuit 110 of FIG. 1, and therefore will not be repeated. Instead of being coupled to the gain control circuit 120, the output of the neural network circuit 110 is coupled to gain control circuit 720.

In the present embodiment, the image processing device 700 may obtain an amplitude gain GS from a selection circuit 724. In FIG. 10, the gain control circuit 720 includes the multiplier circuit 222 and the selection circuit 724. The selection circuit 724 receives the input image IMIN and performs a color range selection process on the input image IMIN, and generates the amplitude gain GS. The multiplier circuit 222, coupled to the neural network circuit 110 and the selection circuit 724, receives the first intermediate image IMR1 from the neural network circuit 110 and receives the amplitude gain GS from the selection circuit 724, respectively, and multiplies the first intermediate image IMR1 by at least one amplitude gain to output the second intermediate image IMR2. The successive enhancement processing on colors by multiplying at least one amplitude gain based on color value of the input image IMIN detected from the color range selection process. The selection circuit 724 may detect which pixels of the input image IMIN have values that fall within a skin tone range STR. The selection circuit 724 may detect a color value of a pixel.

In specific, referring to FIG. 10 and FIG. 11 together, the color ranges of the input image IMIN include a skin tone range STR and a non-skin tone range NSTR. The skin tone range STR is multiplied by a first amplitude gain G1, and the non-skin tone range NSTR is multiplied by a second amplitude gain G2. In. FIG. 11, the first amplitude gain G1 is smaller than the second amplitude gain G2.

When the color value of the input image IMIN detected from the color range selection process is within the skin tone range STR, the selection circuit 724 outputs a first amplitude gain to the multiplier circuit 222 to multiply a smaller amplitude gain (i.e. the first amplitude gain G1) to corresponding pixels of the first intermediate image IMR1. When the color value of the input image IMIN detected from the color range selection process is not within the skin tone range STR, the selection circuit 724 outputs a second amplitude gain G2 to the multiplier circuit 222 to multiply a larger amplitude gain (i.e. the second amplitude gain G2) to the corresponding pixels of the first intermediate image IMR1. The amplitude gain ranges between 0 and 1, which 0 indicates no color enhancement and 1 indicates maximum color enhancement. In this way, the disclosure may prevent color of the skin from getting overly enhanced when the color strength of the input image IMIN is within the skin tone range STR.

The gain control circuit 720 performs the successive enhancement processing on the first intermediate image IMR1 using an amplitude gain from the color selection process to obtain the second intermediate image IMR2. Afterwards, the image merge circuit 140, including the adder circuit 242, is configured to combine the second intermediate image IMR2 and the input image IMIN to obtain the output image IMOUT by adding the second intermediate image IMR2 and the input image IMIN together.

In view of the aforementioned descriptions, an image processing device and a method for image enhancement are proposed. The successive enhancement processing of the gain control circuit can assist enhancing the intermediate image from the neural network circuit to deliver a more enhancement. In this way, the plurality of trained parameters may remain fixed as fixed parameters in the neural network circuit. Therefore, storage space required for neural network parameters and the time required for switching the enhancement effects may be reduced, thereby reducing hardware area and power consumption of the image processing device.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An image processing device, comprising:
    a neural network circuit, configured to receive an input image and perform an image processing operation on the input image according to fixed parameters to output a first intermediate image;
    a gain control circuit, coupled to the neural network circuit, and configured to receive the first intermediate image from the neural network circuit, and multiply the first intermediate image by at least one amplitude gain to output a second intermediate image;
    a scaler circuit, configured to receive and scale the input image, and output the scaled input image; and
    an image merge circuit, coupled to the gain control circuit and the scaler circuit, and configured combine the second intermediate image and the scaled input image to obtain an output image,
    wherein the gain control circuit multiplies the first intermediate image by different amplitude gains according to image details, and the image details comprise edges, texture and/or lines of the first intermediate image.

2. The image processing device of claim 1, wherein the image details correspond to different frequency bands, and the gain control circuit comprises:
    a transformer circuit, coupled to the neural network circuit, and configured to receive and analyze the first intermediate image to obtain the frequency bands corresponding to the image details.

3. The image processing device of claim 2, wherein the gain control circuit multiplies the first intermediate image by the different amplitude gains according to the frequency bands.

4. The image processing device of claim 1, wherein the gain control circuit comprises:
    a detection circuit, configured to receive the input image and detect edges of the input image to obtain edge strength, wherein the gain control circuit multiplies the first intermediate image by different amplitude gains according to the edge strength.

5. The image processing device of claim 4, wherein the edges of the input image comprise a first edge and a second edge, the first edge has a first edge strength, the second edge has a second edge strength smaller than the first edge strength, wherein the first edge is multiplied by a first amplitude gain, the second edge is multiplied by a second amplitude gain, and the first amplitude gain is smaller than the second amplitude gain.

6. A method for image enhancement, comprising:
performing an image processing operation on an input image according to fixed parameters to output a first intermediate image;
multiplying the first intermediate image by at least one amplitude gain to output a second intermediate image;
scaling the input image and outputting the scaled input image; and
combining the second intermediate image and the scaled input image to obtain an output image,
wherein the first intermediate image is multiplied by different amplitude gains according to image details, and the image details comprise edges, texture and/or lines of the first intermediate image.

7. The method for image enhancement of claim 6, wherein the image details correspond to different frequency bands, and the method further comprises:
analyzing the first intermediate image to obtain the frequency bands corresponding to the image details.

8. The method for image enhancement of claim 7, wherein the first intermediate image is multiplied by the different amplitude gains according to the frequency bands.

9. The method for image enhancement of claim 6, further comprising:
detecting edges of the input image to obtain edge strength, wherein the step of multiplying the first intermediate image by the at least one amplitude gain to output the second intermediate image comprises:
multiplying the first intermediate image by different amplitude gains according to the edge strength.

10. The method for image enhancement of claim 9, wherein the edges of the input image comprise a first edge and a second edge, the first edge has a first edge strength, the second edge has a second edge strength smaller than the first edge strength, wherein the first edge is multiplied by a first amplitude gain, the second edge is multiplied by a second amplitude gain, and the first amplitude gain is smaller than the second amplitude gain.

* * * * *